United States Patent [19]

Mayfield

[11] Patent Number: 4,491,190

[45] Date of Patent: Jan. 1, 1985

[54] WEIGHT MEASUREMENT APPARATUS

[76] Inventor: Harvey G. Mayfield, 905 Howell, Wills Point, Tex. 75169

[21] Appl. No.: 462,212

[22] Filed: Jan. 31, 1983

[51] Int. Cl.³ .................................................. G01G 19/10
[52] U.S. Cl. .................................................... 177/139
[58] Field of Search .......................... 177/139; 188/314

[56] References Cited

U.S. PATENT DOCUMENTS

| | | | |
|---|---|---|---|
| 2,109,460 | 3/1938 | Brasher | 177/139 |
| 2,635,868 | 4/1953 | Reid . | |
| 2,767,394 | 10/1956 | Arnot . | |
| 2,850,181 | 9/1958 | Hamblin | 177/139 X |
| 2,851,171 | 9/1958 | Martin . | |
| 3,035,650 | 5/1962 | Friedl . | |
| 3,201,110 | 8/1965 | Taccone | 188/314 X |
| 3,231,035 | 1/1966 | Wise | 177/139 |
| 3,910,363 | 10/1975 | Airesman | 177/139 |
| 4,055,255 | 10/1977 | Vasquez . | |

*Primary Examiner*—E. A. Goldberg
*Assistant Examiner*—Patrick W. Foster
*Attorney, Agent, or Firm*—Gerald G. Crutsinger; John F. Booth; Monty L. Ross

[57] ABSTRACT

A material handling and lift scale device comprising first and second rectangular frame members linked together by a parallelogram linkage system to confine relative movement between said frames to planar-parallel movement in a longitudinal direction only, said first frame member having forklift tines extending essentially perpendicular to said longitudinal direction, said second frame member adapted to be supported and controlled through a three-point hitch connection to a farm vehicle, hydraulic cylinder means connected between said first and said second frame members with the operative axis of said cylinder means aligned in said longitudinal direction and a pressure gauge connected to said hydraulic cylinder means to indicate fluid pressure changes within said hydraulic cylinder means resulting from support of material on said forklift tines tending to produce longitudinal relative motion between said first and second frames, said pressure gauge being calibrated in weight units to indicate directly the weight of said materials supported.

6 Claims, 5 Drawing Figures

WEIGHT MEASUREMENT APPARATUS

This invention relates to weight measurement apparatus and more particularly to weight measurement apparatus adapted to be affixed to vehicles for lifting, transporting, loading and simultaneously weighing materials and/or objects.

While the present invention is useful for numerous purposes in a wide variety of circumstances, it is especially useful as a farm implement attached to a tractor or other farm vehicle to lift, transport, and/or load and simultaneously weigh hay bales, especially round hay bales and other large objects. The invention therefore would be disclosed in the context of its use as a round hay bale lift scale.

In recent years, baling of hay in round bales has become the predominant technique of assembling and storing hay. The hay, after cutting, is gathered and rolled into cylindrical bales by a baling machine. The round bales are ordinarily about three to five and one-half feet in diameter, about four and one-half to five and one-half feet wide and weigh between about 800 and 1500 pounds depending on the size of the baling machine used. Operators usually make some attempt to maintain the bales as uniform as possible in size but control is by no means exact and the weights of bales from some machines often vary as much as 20 to 25% from nominal. Because hay is ordinarily sold by weight it is important to have means to determine the weight of each bale easily, quickly and with reasonable accuracy.

According to the present invention there is provided a forklift type of mechanism having a pair of frame members closely linked together by a parallelogram linkage system in a manner allowing some relative parallel-planer longitudinal movement between the two while restricting their relative lateral movement. One frame member is equipped with two or more horizontally exteding "tines" to form a forklift load support means while the other frame member is equipped to provide attachment to a tractor or other farm vehicle as by the well-known three-point implement hitch. Connected between the frame members is a hydraulic cylinder device load carrying means arranged in such manner that the magnitude of any forces tending to cause relative longitudinal movement between the two frame members will be counteracted by the fluid pressure built up within the hydraulic cylinder device. The weight of an object held suspended by the forklift then is directly proportional to the fluid pressure within the hydraulic cylinder means and may be indicated by a pressure gauge connected to the cylinder means.

It is an object then of the present invention to provide a portable relatively accurate weight measurement apparatus in the form of a lift scale capable of handling objects weighing up to a ton or more.

It is a further object to provide a weight measurement apparatus in the form of a "forklift" and transport device.

It is an even further object to provide a forklift scale device wherein the position of the object to be weighed on the lift and the attitude of the lift are not critical to the accuracy of the weight measurement.

It is a still further object to provide a forklift scale device for attachment to farm vehicles which will provide the operator of the vehicle a direct indication of weight of an object on the scale device while the operator remains at the controls of the vehicle.

These and other objects and advantages of this invention will become apparent from the following detailed description of a preferred embodiment when read with reference to the accompanying drawings wherein:

FIG. 1 is a perspective view of the lift scale weight measurement device of the present invention;

FIG. 2. is a sectional side view of the lift scale device taken along lines 2—2 of FIG. 1 and illustrating the relative positions of various elements during operation of the device;

Figure 1:
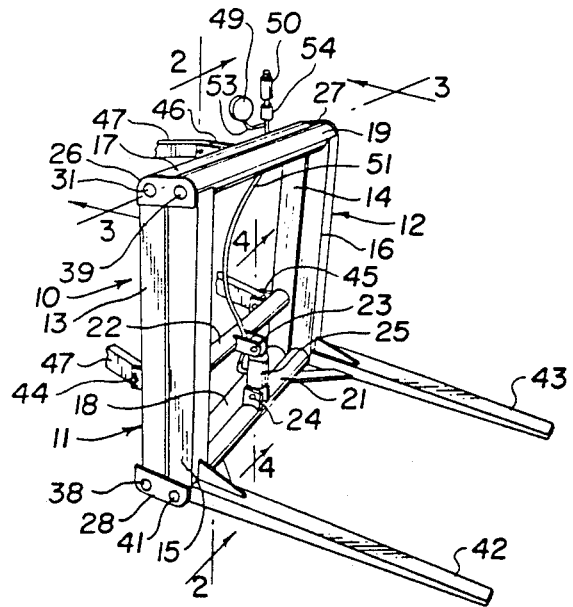

Referring now to the drawings, the lift scale of the present invention, designated generally as 10, comprises a hitch frame 11 and a lift frame 12, each having a pair of upright members 13, 14 and 15, 16, respectively, and a pair of cross members 17, 18 and 19, 21, respectively. In addition, hitch frame 11 has a cross member 22 connected between uprights 13 and 14 at points about ¼ to ⅓ of the length of the uprights from their lower ends. Cross-member 22 is equipped with a horizontally extending brackets 23 at approximately its mid-point and cross-member 21 is equipped with upwardly extending brackets 24 at approximately its mid-point. Hydraulic cylinder device 25, discussed later in more detail, is mounted between brackets 23 and 24.

Hitch frame 11 and lift frame 12 are connected together in a parallelogram linkage system by short link elements 26, 27, 28 and 29. Link elements 26, 27, 28 and 29 are pivotally connected between adjacent frame cross members 17 and 19 and 18 and 21 at each of their ends as shown. Thus, frames 11 and 12 while so connected together are permitted limited parallel-planar relative movement with respect to each other in longitudinal directions only.

Figure 3:
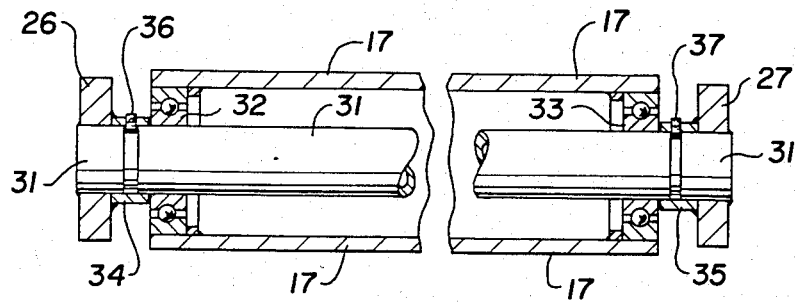
FIG. 3 is a sectional view taken along lines 3—3 of FIG. 1 of the upper cross-element of the hitch frame member.
Figure 4:
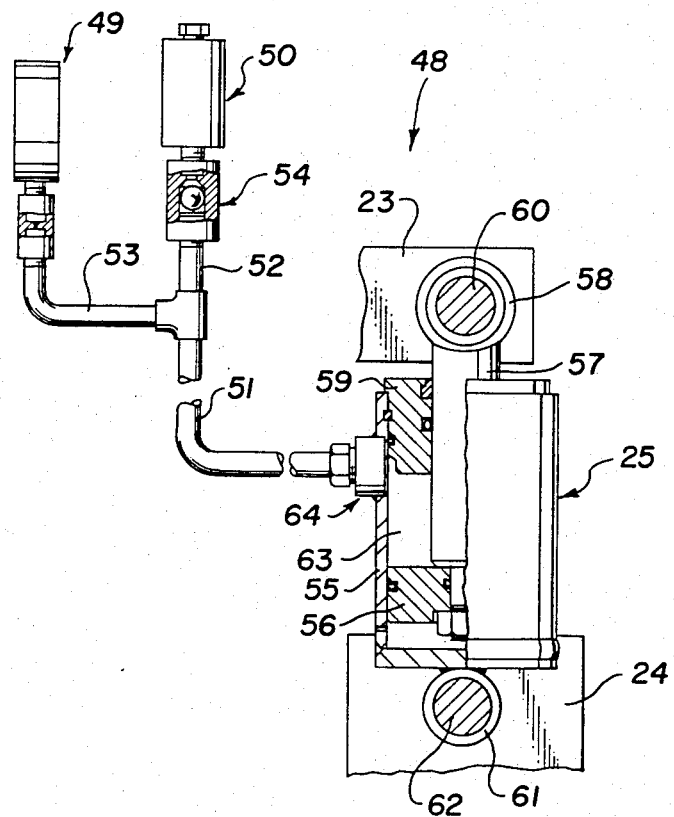
FIG. 4 is a side view taken along lines 4—4 of FIG. 1 illustrating the hydraulic cylinder device, partially in section, and its associated hydraulic system for providing direct weight indication.

The manner of the connection of the linkage elements to the frame cross members is shown in more detail in FIG. 3, a view in section taken along lines 3—3 of FIG. 1. An axle member 31 extends through cross member 17 and is supported for rotational movement therein by bearing members 32 and 33. Linkage elements 26 and 27 have hubs 34 and 35, respectively attached to them. Hub 34 and linkage element 26 fit over and are clamped by set screw 36 to one end of axle 31. Hub 35 and linkage element 27 fit over and are clamped by set screw 37 to the other end of axle 31. In like manner, the linkage elements 26, 27, 28 and 30 are pivotally connected to cross members 18, 19 and 21 through their mounting to the ends of axles 38, 39, and 41, respectively.

Returning now to FIGS. 1 and 2, a pair of horizontally extending tine members 42 and 43 are affixed to the lift frame 12 at the lower ends of the uprights 15 and 16 to form the load support means of the lift fork. A pair of horizontally extending brackets 44 and 45 attached one near each end of cross member 22 and horizontally extending bracket 46 attached at about the middle of cross member 17 provide for attachment of the lift scale 10 to a farm vehicle 65 (schematically shown) through connection of standard "three-point" hitch elements 47 between the farm vehicle and brackets 44, 45, and 46.

The various elements and members of the lift scale apparatus 10 of the present invention may be made of steel or other structural materials of suitable strength and characteristics. As shown, the apparatus is primarily of welded construction.

The weight read-out mechanism 48 of the present invention comprises hydraulic cylinder device 25, which acts as the load carrying member, and its associated hydraulic system including pressure gauge 49, fluid reservoir 50, interconnecting high pressure hydraulic lines 51, 52, and 53 and check valve 54.

Hydraulic cylinder device 25 is of the common type comprising a cylinder member 55 closed at one end, a piston member 56 slideably mounted within the cylinder 55 and affixed to a rod member 57 extending out of the open end of the cylinder 55. A plug member 59 provides a fluid tight seal to the cylinder at its open end and around the rod member 57 while allowing relatively free movement of the rod member therethrough. The piston member 56, although relatively free to slide within the cylinder forms a fluid tight seal about its periphery with the walls of cylinder 55. As shown, the external end of rod member terminates in a connecting ring 58 for pivotal connection of the rod member to brackets 23 of hitch frame 11 as by a pin 60. The cylinder member is likewise connected to brackets 24 on lift frame 12 by means of a connecting ring 61 and pin 62. In practice, of course, it does not matter which end of the hydraulic cylinder device it is connected to which frame.

The chamber 63 formed between piston 56 and plug 59 is connected with the pressure gauge 49 through a port at 64 in the side walls of cylinder 55 and hydraulic lines 51 and 53 and additionally to reservoir 50 through hydraulic line 52 and check valve 54.

Operation of the lift scale device of the present invention is best described with reference to FIG. 2. The lift scale 10 may be attached by hitch members 47 to a farm vehicle 65 such as a tractor here represented schematically. The lift scale 10 is lowered to place the tines 42 and 43 at essentially ground level and then maneuvered by the tractor to push the tines under hay bale 66 to be transported and/or weighed. Obviously, the sloped shape of the tines makes them easier to slide under the bale. The hitch lift mechanism is then activated so that hitch elements 47 raise the lift scale 10 with hay bale 66 resting on tines 42 and 43 to about the position shown in the dashed lines of FIG. 2.

The weight of bale 66 produces forces tending to move the lift frame 12 generally downward, i.e., longitudinally, with respect to the hitch frame 11. This relative movement between the two frames however, is resisted by hydraulic cylinder device 25 connected between the two frames as previously described. Thus, the force produced by the weight of bale 66 is transmitted to hydraulic unit 25 tending to move piston 56 upward relative to cylinder 55. The fluid pressure within the chamber 63 is thereby increased in direct proportion to the weight of bale 66. This increase in fluid pressure is transmitted through lines 51, 52, and 53 to close check valve 54 and produce a quantitative indication on gauge 49. Inasmuch as the pressure increase in the hydraulic system is directly proportional to the force produced by the weight resting on tines 42 and 43, gauge 49 may be calibrated to read directly in weight units, such as pounds, kilograms, or whatever may be desired.

The particular linkage system of the doubly pivoted links 26, 27, 28 and 29 connecting frames 11 and 12 in the parallelogram linkage restricts the relative movement of the frames 11 and 12 to a longitudinal parallel-planar movement, that is, any plane defined within one frame as parallel to an arbitrary plane defined within the other frame will remain parallel to that arbitrary plane during the full range of longitudinal relative movement between the frames permitted by the parallelogram linkage.

It is a feature of the present invention that the relative movement between the lift frame 12 and the hitch frame 11 is quite small since the weight detection is by means of pressure changes produced in a relatively inelastic system and transmitted through a non-compressible fluid. Such a small movement is effectively confined then to a single plane. Mounting brackets 23 and 24 are positioned to axially align the hydraulic cylinder device 25 with the longitudinal direction in a plane the same as or parallel to the plane of motion of the moving frame. Thus, no force components acting perpendicular to the motion planes of the frames is transmitted to the hydraulic unit 25. Because only the forces tending to produce parallel movement of the frames 11 and 12 is detected as an indication of the weight, the system is not sensitive to any variations of the position of the bale 66 on the lift tines. This is in contrast to many prior art systems wherein the position of the object to be weighed on the lift tines affects the length of a moment arm in the scale linkage thus affecting the accuracy of readout.

Figure 2:
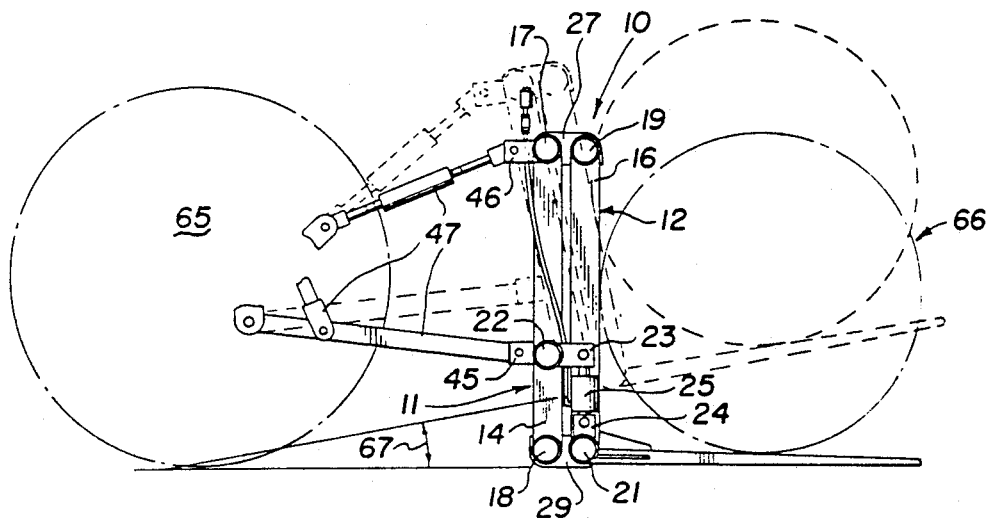

Even though the present system uses only forces tending to produce parallel relative movement between the frames as the weight indicator, very little error is produced in weight indication when the frames are raised to a position not precisely vertical such as the position indicated by the dashed lines of FIG. 2. When the frames of the lift scale device 10 the present invention are angled from vertical, the "parallel" forces between the frames used as an indicator weight is a cosine function of the vertical force exerted by the bale which represents the true weight of the bale. Thus, when the lift scale 10 is raised to a slant angle 67 of, for example, five degrees, the indication error is only 0.3%. At a 8° angle, the indication error is still only about 0.9% and at an angle of 10° the error is only approximately 1.5%.

Fluid reservoir 50 and check valve 54 function to maintain the hydraulic system at all times full of the non-compressible hydraulic liquid and to drain off any compressible gas or air accidently leaking into the system. Reservoir 50 is mounted as the highest element in the system. A reserve amount of hydraulic fluid is maintained therein. Check valve 54 is designed to be open and allow any gas or air in the system to pass through it and surface in the reservoir 50. Also it allows any hydraulic fluid needed to fill the system below to be supplied from the reservoir. However, any relatively sudden increase in fluid pressure from the cylinder device 25 will close check valve 54 to seal the system for transmission of the fluid pressure to the indicator gauge 49. Thus, when the lift scale 10 is elevated with a weight supported on the tines 42 and 43, check valve 54 closes and the pressure in the system is indicated by gauge 49.

It will be obvious that the exact positioning of hydraulic cylinder device 25 with respect to the frames 11 and 12 is unimportant so long as it is axially aligned as previously described so as to receive only the force tending to produce an essentially planar-longitudinal relative movement between the frame.

Figure 5:
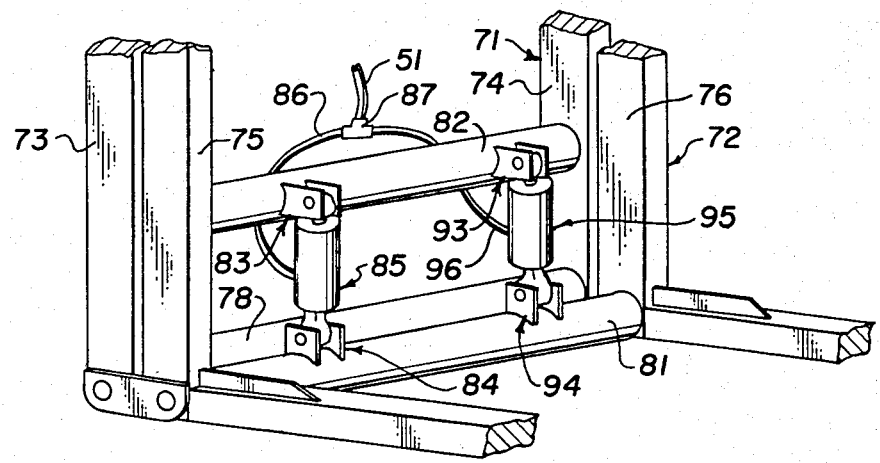
FIG. 5 is a partial view of perspective illustrating a second embodiment of the lift scale.

Although only a single hydraulic cylinder device is shown in the embodiments of FIGS. 1 and 2, several such devices may be used in parallel. For example, as shown in FIG. 5 which is a fragmentary perspective view of a second embodiment 70 of the lift scale of the present invention two cylinder devices are used. In FIG. 5 only portions of the hitch frame 71 and lift frame 72 are shown. Upright members 73, 74, 75 and 76 and cross members 78, 81 and 82 correspond to members 13, 14, 15, 16, 18, 21 and 22, respectively of the embodiment of FIGS. 1 and 2. In FIG. 5 the load carrying or force detection means comprises a pair of hydraulic cylinder devices 85 and 95 mounted between upper and lower brackets 83 and 84 and between upper and lower brackets 93 and 94, respectively by means similar to that by which cylinder device 25 is mounted in the first embodiment. Hydraulic lines 86 and 96 connect the fluid pressure chambers of devices 85 and 95, respectively, to hydraulic line 51 through a "tee" connection 87. Assuming cylinder devices 85 and 95 are of the same size as the cylinder device 25, in the system of FIG. 1, the system of FIG. 5 has the advantage of operating at a hydraulic system pressure of just one-half that of the system of FIG. 1 for the same weight capacity. This is possible since the force produced by the load to be weighed is distributed over a pressure piston area twice that of the system of FIG. 1. Further, since the pressure in the hydraulic system must remain uniform throughout the system, any unequal distribution of the load on the tines of the lift fork will not affect the accuracy of the system.

Having described the invention, what is claimed is:

1. Weight measurement apparatus comprising: first and second frame members, said first and second frame members being linked together by a parallelogram linkage system restricting relative movement between said frame members to a planar-parallel movement in a longitidinal direction, load support means secured to said first frame member, support attachment means affixed to said second frame member, first anchor means rigidly secured to said first frame member, second anchor means rigidly secured to said second frame member, a load carrying hydraulic cylinder device connected between said first and said second anchor means, said load carrying hydraulic cylinder device having its operational axis aligned with said longitudinal direction and so limiting the longitudinal movement of each of said frames relative to the other as to be within essentially a single plane, fluid pressure indicator means associated with said load carrying hydraulic cylinder device to provide an indication of the magnitude of force exerted by said load carrying cylinder device in opposition to any longitudinal relative movement between said first and second frames.

2. Weight measurement apparatus as defined in claim 1 wherein said fluid pressure indicator means comprises a pressure gauge, a fluid line connecting said gauge to said hydraulic cylinder device, a reservoir, a fill line between said reservoir and said hydraulic cylinder device and a check valve in said fill line permitting flow of liquid between said reservoir and said fill line, said check valve and said reservoir being positioned at an elevation above the elevation of said gauge and said hydraulic cylinder device.

3. Weight measurement apparatus as defined in claim 2 wherein said check valve comprises a valve seat and a valve element, said valve seat being positioned at an elevation above said valve element such that said valve element is biased by gravity away from said valve seat and wherein said valve element is adapted to move out of sealing relationship with said valve seat when pressure in said fill line is near zero and to be moved into sealing relationship with said valve seat by a relatively sudden increase in pressure in said fill line but to remain out of sealing relationship with said said valve seat during the relatively slow increase in pressure resulting from thermal expansion of fluid within said at least one hydraulic cylinder device.

4. Weight measurement apparatus as defined in claim 1 wherein said support attachment means is adapted to be connected to support means including a three-point hitch on a vehicle and means to raise and lower said second frame member with respect to said vehicle.

5. Weight measurement apparatus as defined in claim 4 wherein said load support means comprises a pair of lift fork tines secured to said first frame member.

6. A round bale material handling and liftscale device comprising: a farm vehicle; a three-point hitch on said farm vehicle; first and second rectangular frame members; a parallelogram linkage system pivotally secured between said first and second frame members to confine relative movement between said frames to planar-parallel movement in a longitudinal direction only, said first frame member having tines extending essentially perpendicular to said longitudinal direction; means on said second frame member mounting said second frame member to be supported and controlled through said three-point hitch such that said first and said frame members rotate from a generally vertical plane when said frames are elevated to cradle a round bale of material resting on said tines; hydraulic cylinder means; means connecting said hydraulic cylinder means between said first and said second frame members with the operative axis of said cylinder means aligned in said longitudinal direction such that the weight of said second frame member, said tines and material resting on said tines is supported by said cylinder means; and a pressure gauge to indicate fluid pressure changes within said hydraulic cylinder means resulting from the weight of material on said tines tending to produce longitudinal relative motion between said first and second frames, said pressure gauge being calibrated in weight units to indicate directly the weight of said materials supported; a fluid line connecting said gauge to said hydraulic cylinder means; a reservoir; a fill line between said reservoir and said hydraulic cylinder means device; and check valve in said fill line permitting flow of fluid between said reservoir and said fill line, said check valve and said reservoir being positioned at an elevation above the elevation of said gauge and said hydraulic cylinder means.

* * * * *